Dec. 24, 1929.  S. R. COLEMAN  1,740,497
CONTINUOUS CALENDAR
Filed May 5, 1928   2 Sheets-Sheet 1
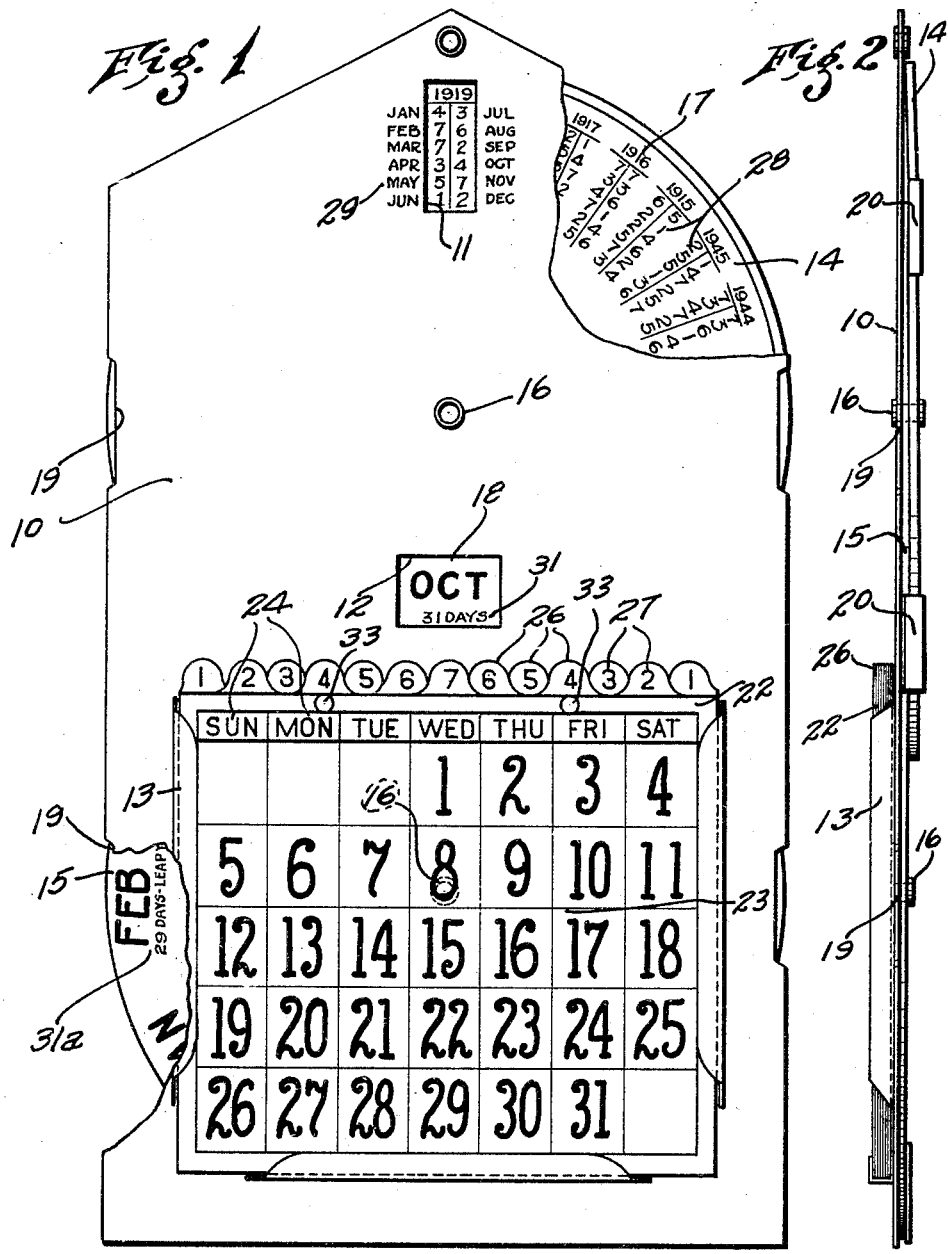
INVENTOR.
Stephen R. Coleman
BY Westall and Wallace
ATTORNEYS Dec. 24, 1929.   S. R. COLEMAN   1,740,497
CONTINUOUS CALENDAR
Filed May 5, 1928   2 Sheets-Sheet 2

Fig. 3

| SUN | MON | TUE | WED | THU | FRI | SAT |
|---|---|---|---|---|---|---|
|  |  | 1 | 2 | 3 | 4 | 5 |
| 6 | 7 | 8 | 9 | 10 | 11 | 12 |
| 13 | 14 | 15 | 16 | 17 | 18 | 19 |
| 20 | 21 | 22 | 23 | 24 | 25 | 26 |
| 27 | 28 | 29 | 30 | 31 |  |  |

Fig. 4

| SUN | MON | TUE | WED | THU | FRI | SAT |
|---|---|---|---|---|---|---|
|  |  | 1 | 2 | 3 | 4 | 5 |
| 6 | 7 | 8 | 9 | 10 | 11 | 12 |
| 13 | 14 | 15 | 16 | 17 | 18 | 19 |
| 20 | 21 | 22 | 23 | 24 | 25 | 26 |
| 27 | 28 | 29 | 30 |  |  |  |

INVENTOR.
Stephen R. Coleman
BY Nestall and Wallace
ATTORNEYS

Patented Dec. 24, 1929

1,740,497

UNITED STATES PATENT OFFICE

STEPHEN R. COLEMAN, OF LOS ANGELES, CALIFORNIA

CONTINUOUS CALENDAR

Application filed May 5, 1928. Serial No. 275,294.

This invention relates to calendars in which by selectively displaying interrelated indicating media the correct calendar for any month of a predetermined year may be shown.

It is an object of the invention to provide a calendar which will have substantially the appearance of a usual calendar including a year and month indicating means and a consecutively numbered chart indicating the days of the month and so arranged with relation to indicating means for the days of the week as to present a correct calendar for the specified month and year; and to also provide extremely simple and convenient means for readily changing the monthly charts and the month and year indicating media so as to show the correct relation between the monthly dates and the days of the week for any desired month.

It is another object of the invention to provide extremely simple but positive means for indicating the correct monthly chart to be employed in connection with any year and month displayed by the calendar, and to arrange the interchangeable monthly charts for convenient selection and conspicuous display of only that chart which is indicated as being correct for use in connection with any particular month and year.

It is a still further object of the invention to provide the monthly charts with indices corresponding to the information displayed by the year and month indicating media so that the correct monthly chart may be readily selected, and to arrange the indices so that they are visible in their entirety at all times in order that they may be conveniently consulted for proper chart selection.

It is still another object of the invention to arrange the indices so that they will be displayed in the same consecutive order irrespective of the relative arrangement or displaying of any particular monthly chart, thereby permitting the desired indices to be quickly located for selecting the corresponding chart; and the invention may also provide means associated with the indices for denoting the uppermost index or indices and the corresponding monthly chart without disturbing the consecutive arrangement of the indices.

These objects together with other accomplishments may be obtained by the embodiment of the invention illustrated in the accompanying drawings, in which:—

Fig. 1 is a front view of the calendar partly broken away; Fig. 2 is a side view of the calendar; Figs. 3 and 4 are opposite face views of one of the monthly charts for the calendar.

The invention is shown embodied in a suitable support which includes a face member 10 having display openings 11 and 12 and an open-faced container or pocket 13 for a plurality of charts. Year and month indicating means are mounted at the rear of face member 10 for selective alinement of year and month indices with the display openings 11 and 12, and in the present embodiment these indicating means are shown as discs 14 and 15 rotatably mounted on the back of face member 10, as for example by eyelets 16, with consecutive year and month indices 17 and 18 on the respective discs 14 and 15 adapted for successive alinement with openings 11 and 12 by rotating the discs. The edges of face member 10 may be recessed as shown at 19 so that the peripheries of the discs may be conveniently engaged for turning the same, and in order to hold the rotatable discs against the back of face member 10 the latter may be provided with retaining loops 20 adapted to overlie the rotatable discs.

The pocket 13 may be any usual structure adapted for mounting on face member 10, preferably below the month indicating opening 12, and adapted to hold a plurality of cards or chart members 22 so as to display the face of the uppermost card and permit their convenient withdrawal and insertion for rearrangement in the pocket so as to display any desired card. The cards are provided with usual tables or charts 23 consecutively numbered to indicate the days of a month, with the numbers arranged in usual columns so that all of the dates for the same day of the week are in the same column. The columns are provided with usual indices 24 denoting the consecutive days of the week, and the monthly charts on the different cards are so arranged as to show the month starting on the different days of the week as will be understood by comparison of Figs. 1 and 3, thereby necessitating the use of seven cards. The charts 23 are preferably provided on both faces of cards 22, and the charts on the opposite faces of each card are preferably similarly arranged as regards the relation between the days of the week and the monthly dates, but the chart at one face of a card is numbered to indicate a 31-day month while the chart at the opposite face of the card denotes a 30-day month. This arrangement is illustrated in Figs. 3 and 4 showing the opposite faces of the same card.

By turning discs 14 and 15 so as to display any desired year and month at the corresponding openings 11 and 12, and by selecting the card 22 which has the corresponding correct arrangement of the monthly dates with relation to the days of the week and displaying that side of the selected card which shows either 30 or 31 days as corresponds with the indicated month, a correct monthly calendar of usual appearance is provided.

In order to indicate the correct chart 23 to be used in connection with a month and year, indicating means are associated with the respective year and month indices 17 and 18 and cooperate with suitable indices on the cards 22 for denoting their correct selection for display. As an instance of this arrangement the cards 22 may be provided with projecting tabs 26 bearing suitable distinctive symbols 27, as for example a consecutive numbering from "1" to "7", and the year indices 17 each have a cooperating indicating means 28 which comprises an arrangement of these same symbols denoting the correct card to be used for any month of that year. For this purpose the months of the year may be indicated at the sides of opening 11 as shown at 29, and the symbols which comprise the indicators 28 are arranged on disc 14 adjacent the corresponding year indices 17 so as to cooperate with the month indicator 29 for denoting the correct index symbols for the respective months of that year. The disk 14 has arranged thereon in an annulus the several years extending over the period for which the calendar is designed, for illustration, 1915 to 1945. These year numbers are so disposed that each year number may be displayed singly at the top of the window opening 11. In a pair of radial columns below each year are numbers ranging from 1 to 7. At the sides of the window opening are characters indicating the several months of a year arranged consecutively in two columns. The numbers 1 to 7 are disposed in the pairs of columns so that for a given year a correspondingly numbered month chart is indicated. By selecting the cards 22 in accordance with the index symbols for the respective months as displayed at opening 11, the correct card for any month of the year may be displayed.

In order to indicate whether the 30-day or the 31-day face of the card should be displayed, the month indices 18 may have associated therewith indicators 31 reading either "30 Days" or "31 Days" to properly denote the number of days in the respective months, and the user may thus be guided by the indicator 31 which is displayed at opening 12 in choosing for display that face of the selected card which correctly denotes the number of days in the month. The indicator associated with the index for the month of February, instead of reading either "30 Days" or "31 Days" as above described, may be provided with readings of "28 Days" and "29 Days—Leap Year" as shown at 31$^a$, and either face of the correct card 22 may then be displayed during the month of February, since the user is informed by the indicator 31$^a$ that the chart numerals indicating the dates from the 29th to 31st of the month are to be disregarded, except in leap year when the numerals for only the dates 30th and 31st are to be so ignored.

In order that all of the index tabs 26 may be clearly visible when the cards 22 are mounted in pocket 13, the tabs for the different cards are staggered as shown in Fig. 1 and each face of each tab bears its index symbol 27 as shown in Figs. 3 and 4; and to provide for conveniently consulting the index formed by the tabs and quickly selecting the card bearing the desired index symbol, one of the cards preferably has a single tab medially of its width and bearing the index symbol "7", and the other cards are each provided with two of the tabs 26 symmetrically spaced in successively staggered relation at each side of the single tab bearing the symbol "7" and consecutively marked with the index symbols reading "6" to "1" in either direction from said single tab, so that no matter which face of a card is turned outwardly and irrespective of the successive arrangement of the cards in pocket 13, the index tabs 26 will present a successive reading from "1" to "7" in a normal reading position from left to right at the left hand side of the cards.

As a result of this arrangement whereby the tabs 26 always present a successive reading of the index symbols 27, it is not immediately apparent which card is on display unless a further indicating means is provided, so in order to identify the index symbol or symbols of that card which is on display, indicating means shown as conspicuous marking 33 may be provided on both faces of the cards 22 adjacent the index symbols of their respective index tabs 26. These markings on all of the cards except the topmost card are concealed by that card which is uppermost and on display, while the markings 33 of the displayed card are readily seen and thereby indicate that the card on display is that one bearing the index symbol which appears immediately adjacent the visible markings 33.

The user being thus advised as to the card on display may readily ascertain by reference to the indicators 28 and 31 whether a different chart is to be used when discs 14 and 15 are rotated so as to show a different predetermined month and year, and if such change in the charts is indicated the user by noting the symbol of indicator 28 which alines with the desired month of indicator 29 may properly select a card by reference to the consecutively numbered index symbols 27 appearing at the left hand side of the cards. With the correct card thus selected the chart on its opposite faces for either a 30-day or a 31-day month is used according to the information provided by the indicator 31 which appears at opening 12. The selected card is placed in pocket 13 as the topmost card with its selected chart face turned outwardly so as to display the correct monthly calendar for the indicated year and month.

What I claim is:—

1. A calendar comprising members having year and month indices adapted for selective exposure to indicate a predetermined month and year, a plurality of cards having monthly calendar charts on their respective faces, the charts on the different cards indicating the start of the month on different days of the week, with the charts on opposite faces of each card indicating the start of the month on the same day of the week but indicating months comprising a different number of days, means for supporting the charts in superimposed relation so as to permit their reversal for displaying the chart on either face of a selected topmost card, means associated with the month indices and adapted for exposure therewith to indicate the face of the selected card to be displayed for the indicated month, and means associated with the year indices and adapted for exposure therewith to indicate the cards to be selected for the respective months of the indicated year.

2. A calendar having display openings, a plurality of cards having monthly calendar charts on their respective faces, the charts on the different cards indicating the start of the month on different days of the week with the charts on opposite faces of each card indicating the start of the month on the same day of the week but indicating months comprising a different number of days, a member having month indices for selective exposure at one of said display openings, means associated with the month indices and adapted for exposure therewith at said display opening to indicate the face of the selected card to be displayed for the indicated month, means at another of the display openings for indicating the respective months of the year, a member having year indices adapted for selective exposure at said other display openings to indicate a predetermined year, symbols on said member adjacent the respective year indices and adapted for exposure therewith at said other display opening, with said exposed symbols arranged for cooperation with the month indicating means to denote the cards to be selected for the respective months of the indicated year.

3. A calendar comprising a plurality of cards having monthly calendar charts on their respective faces, the charts on the different cards indicating the start of the month on different days of the week with the charts on opposite faces of each card indicating the start of the month on the same day of the week but indicating months comprising a different number of days, means for supporting the cards in superimposed relation so as to permit their reversal for displaying the chart on either face of a selected topmost card, index tabs on the respective cards displaying the same index symbol at the opposite faces of each card, means cooperating with the index tabs for indicating the cards to be selected and means for indicating the faces thereof to be exposed for the respective months of a predetermined year.

4. A calendar comprising a plurality of cards having monthly calendar charts on their respective faces, the charts on the different cards indicating the start of the month on different days of the week with the charts on opposite faces of each card indicating the start of the month on the same day of the week but indicating months comprising a different number of days, means for supporting the cards in superimposed relation so as to permit their reversal for displaying the chart on either face of a selected topmost card, index tabs on the respective cards displaying the same index symbol at the opposite faces of each card, one of said cards having its index tab medially of its width, and the remaining cards each having a pair of said index tabs successively symmetrically spaced at the respective sides of said medial tab, means cooperating with the index tabs for indicating the cards to be selected and means for indicating the faces thereof to be exposed for the respective months of a predetermined year.

In witness that I claim the foregoing I have hereunto subscribed my name this 30th day of March, 1928.

STEPHEN R. COLEMAN